July 26, 1932.  W. L. MERRILL  1,869,161
HEAT CONTROL APPARATUS
Filed March 12, 1931
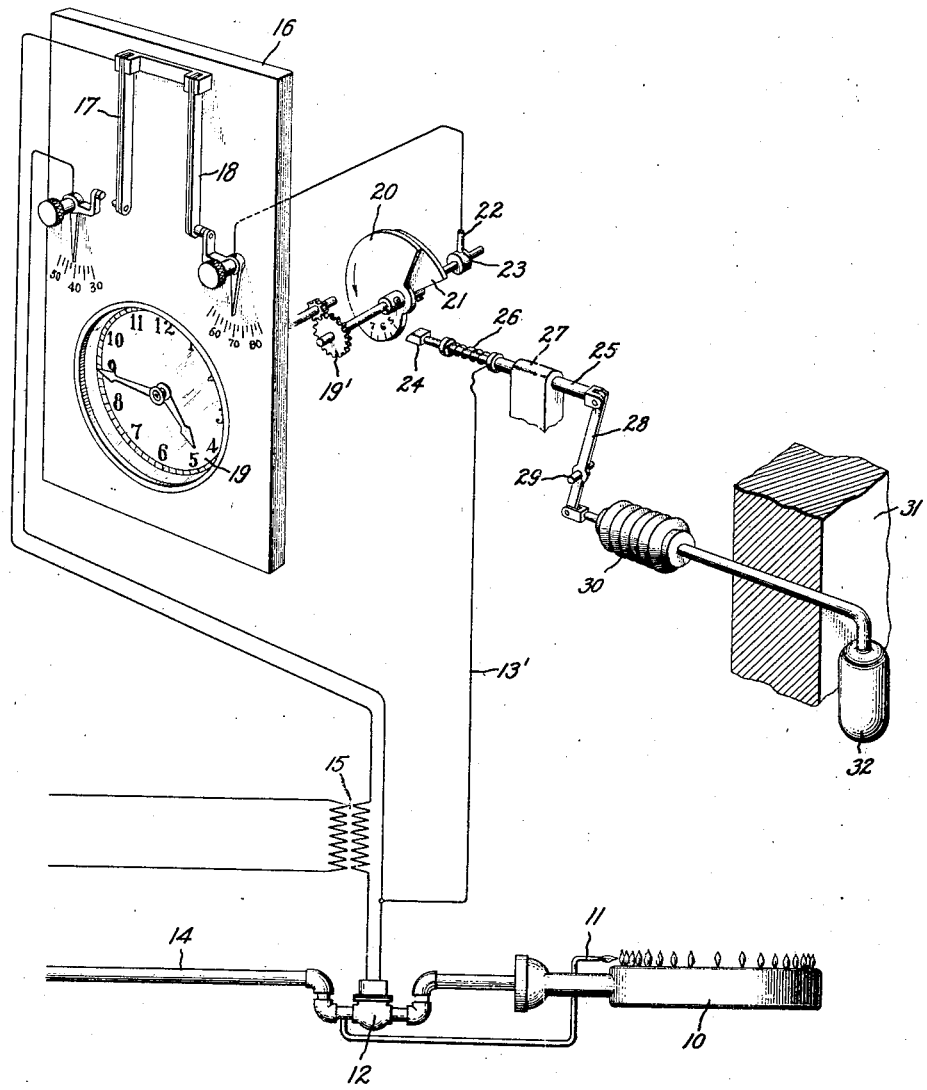
Inventor:
Wilbur L. Merrill.
by Charles V. Tullar
His Attorney.

Patented July 26, 1932

1,869,161

UNITED STATES PATENT OFFICE

WILBUR L. MERRILL, OF SCOTIA, NEW YORK, ASSIGNOR TO GENERAL ELECTRIC COMPANY, A CORPORATION OF NEW YORK

HEAT CONTROL APPARATUS

Application filed March 12, 1931. Serial No. 522,150.

My invention relates to heat control apparatus, more particularly to time controlled thermostatic devices for maintaining predetermined temperatures.

The usual form of timed thermostatic furnace control for gas, oil, or coal fired furnaces is so constructed that it is set to start furnace operations at a definite time in the morning regardless of the outdoor temperature or the temperature of the house. On cold mornings due to the lag of the heating system a longer time will be required for the heating system to bring about the desired temperature for which the thermostat is set than is necessary on warmer mornings. Thus on cold mornings the temperature of the house may not be raised to the desired temperature until some time after such temperature is desired. On the other hand, on a warm morning the temperature of the house to be heated is reached before the time when such temperature is desired, thus wasting fuel. No means has heretofore been devised so far as I am aware for taking into account the varying ambient temperatures within or without the house so that the heating system will be energized at the proper time to bring the temperature of the heating system up to that necessary for obtaining the desired temperature at the desired time.

Hence, it is a principal object of my invention to provide a thermostatic control device of the above character which will cause the heating system to furnish the desired heat at the desired time irrespective of the ambient temperature either indoors or outdoors.

More particularly it is an object of my invention to provide a time controlled thermostatic apparatus which will energize the heating system at an earlier time on cold mornings than on warm mornings so that the heating system will furnish the necessary heat to bring about the desired temperature at the desired time.

Briefly, in one form of my invention a clock mechanism is provided with a unique switch which is responsive to varying ambient temperatures outside or inside the house, the system being applicable to either condition, which switch in turn controls the operation of the thermostatic mechanism. The switch consists of a cam member of peculiar shape which is rotated by means of a clock mechanism. A cooperating switch member for completing the control circuit through the thermostatic device is in turn controlled by a metal bellows member containing a fluid responsive to temperature conditions. This movable member is moved towards and from the cam member in accordance with the varying ambient temperatures so that on cold mornings the switch is closed at an earlier time to render the thermostatic control apparatus operative to control the heating system. On warmer mornings the cooperating switch member does not contact with the cam mechanism until a later time so that the thermostatic device is rendered operative to control the heating system at a later period. This switch mechanism is calibrated for the particular heating system which it will control since the lag of different heating systems for particular houses will most likely vary. Although my system is described in connection with a house heating system it must be observed that it is also applicable to control heating systems wherever used in which it is desired to bring about a predetermined temperature at a particular time regardless of the ambient temperatures in which the heating system operates.

The drawing represents a schematic showing of my invention applied to a gas burning heating system.

A gas burner 10 is provided with a pilot light 11 which is directly connected to the supply main 14. Inserted between the supply main 14 and the burner 10 is the valve 12. The valve is electromagnetically operated and supplied through a transformer 15 with necessary energy. The valve 12 is controlled by means of the thermostats 17 and 18 which will be designated as the low temperature or night thermostat, and the high temperature or day thermostat respectively. A clock mechanism 19 is supported by means of a base 16 which also supports the thermostats 17 and 18. Connected in series with the thermostat 18 is the time switch comprising the cam 20 driven by the clock mechanism by means of proper reduction gearing 19' which will give one rotation of the cam member 20 every twenty-four hours. A movable portion 21 of the cam permits the period during which the thermostat 18 is in the control circuit to be varied by increasing or decreasing the cam face as will be readily understood. A brush 22 cooperates with a collar 23 for completing a circuit through the cam member. The cooperating switch member 24 contacts with the cam 20 to place thermostat 18 in the control circuit. The cooperating member 24 is slidably mounted in a sleeve 25 and held in its advance position by means of a light spring 26, the purpose being that when the member 24 is moved to contact with the cam member 20 and the cam is rotated so that a large radius is presented as the cam rotates, the member 24 may recede within the sleeve 25. The sleeve 25 is slidably supported in the bearing 27 and is operated by means of a link 28 pivoted at 29, which link is connected with the metal bellows member 30. A bulb 32 is placed at some point within the house or may be placed on the outside of the house to be heated by extending it through the house wall 31 as shown. The bellows and the bulb 32 are filled with some liquid, such as alcohol, which will expand and contract in response to temperature changes outside of the house.

It will be noted that the cam 20 is provided with an involute portion having marked thereon the figures 5, 6 and 7. This permits the circuit through the thermostat 18 to be closed at different times. Thus when the temperature within the house is very cold the metal bellows member contracts forcing the sleeve 25 to the left, thus bringing the member 24 closer to the cam member 20. This means that the cam switch will be closed at say 5 o'clock. If the temperature is higher the metal bellows expands and retracts member 24 slightly so that now the cam and member 24 contact at a later time, say 6 o'clock, this portion of the cam having a greater radius than the radius of the portion of the cam marked 5. A still warmer morning, of course, will have the effect of further expanding the bellows member 30 and still further retracting the member 24 so that the cam and member 24 cooperate to close the circuit at a still later time. It will, of course, be understood that it will be necessary to calibrate the cam-switch member so that proper operation will result.

The operation of the device is as follows:

During the night an absolute minimum temperature is maintained by means of the thermostat 17 since the cam 20 will be so set that the circuit through the thermostat 18 will be open during the night. Since the temperature of the system will be maintained above that for which the thermostat 17 is set this thermostat will be open during the day. The cam 20 is constantly rotating. If the morning is very cold the bellows member 30 will contract as explained above forcing the member 24 to the left and contact will be had with the cam at an early hour, for example 5 o'clock. A circuit is then completed through the valve 12 by means of the conductors 13', member 24, cam 20, collar 23, brush 22, thermostat 18, through the transformer 15 back to the other side of the valve. The circuit of course remains closed until the thermostat 18 opens. The cam switch is closed for the remainder of the day until such time in the evening as the cam 21 is set to break the contact with member 24. It will be seen that when the member 24 reaches the edge of the cam surface 21 further contact cannot be had since the member 24 rides off the cam face. This then permits the thermostat 17 to control the heating apparatus. As has been explained above, the outside temperature, if that is the temperature which is used to control the cam switch, determines when the cam switch will close in the morning so that the desired temperature will be obtained at a predetermined time in the morning regardless of the outside temperature. Of course, it is understood that the thermostat 17 could be eliminated from the system if it were not desired to maintain a minimum temperature during the night.

It will be observed that even when this thermostat 17 is used to maintain a predetermined limit of low temperature during the night, on cold mornings the system will take longer to bring about the predetermined temperature since the loss of heat from the house to be heated will be greater on cold days than on warmer days because the temperature gradient between the interior of the house and the exterior of the house is increased by fall in outside temperature and the rate of heat loss other factors being the same, as is well known, depends upon the difference in temperature between the heated object and the ambient temperature surrounding the object.

It will thus be apparent that I have provided a unique thermostatic control apparatus for providing a predetermined temperature and which overcomes the difficulties heretofore present in like systems, that is the inability of present systems to take into account the varying ambient temperatures within and without the house to be heated.

The embodiment of the invention illustrated and described herein has been selected for the purpose of clearly setting forth the principles involved. It will be apparent, however, that the invention is susceptible of being modified to meet the different conditions encountered in its use, and I, therefore, aim to cover by the appended claims all of the modifications within the true spirit and scope of my invention.

What I claim as new and desire to secure by Letters Patent of the United States, is:

1. A temperature control apparatus for a heating system including a thermostat, a timing device for rendering said thermostat effective to control said heating system to maintain a predetermined temperature, said device including an adjustable cam, and a thermostatic device responsive to predetermined ambient temperatures above which said heating system is to be operated for determining the time at which said control apparatus is to be effective dependent upon said ambient temperatures.

2. A temperature control apparatus for a heating system having a heat supplying means electrically controlled, said control apparatus including a thermostat for maintaining a predetermined temperature, a time switch cooperating with said thermostat including an adjustable cam and a thermostatically controlled member cooperating with said cam and responsive to predetermined ambient temperatures exterior of said heating system for rendering said thermostat effective to control said heating system at a time dependent on said predetermined ambient temperatures.

3. A temperature control apparatus for a heating system including a thermostatic device, a timing mechanism including a rotatable cam, a member cooperating with and movable toward and from said cam, and a device responsive to predetermined ambient temperatures exterior of said heating system for determining the movement of said member, said cam and member cooperating to render said control apparatus active at a time dependent upon said predetermined ambient temperatures.

4. A temperature control apparatus for a heating system including a thermostatic device for maintaining a predetermined temperature, a timing mechanism for rendering said thermostatic device operative to maintain a predetermined temperature for a predetermined period including a rotatable cam and a member for cooperating with and movable toward and from said cam, a temperature responsive device for determining the movement of said member, said temperature responsive device responding to predetermined ambient temperatures exterior of said heating system to maintain the length of said period substantially independent of said exterior ambient temperatures.

5. In combination, a temperature control device for a heating system having a thermostat responsive to the heating effect of said heating system for maintaining a predetermined temperature, a timing device, and means responsive to predetermined ambient temperature conditions exterior of said heating system and cooperating with said timing device for rendering said thermostat effective at a time dependent upon said ambient temperature conditions.

6. In combination, a structure to be heated, a heating means therefor, a thermostat responsive within said structure for controlling said heating means to maintain a predetermined temperature within said structure, a timing device including a thermostatic device responsive to ambient temperatures exterior of said structure to be heated for rendering said thermostat effective to control said heating means, said timing means varying the time at which said thermostat is rendered effective dependent upon said ambient temperatures.

7. In combination, a heating system, a temperature control device therefor including a thermostat responsive to the heating effect of said system for maintaining a predetermined temperature, a timing switch having a cam, and thermostatic means responsive to ambient temperature conditions exterior of said heating system and cooperating with said cam for rendering said thermostat effective at a time dependent upon said ambient temperature conditions.

8. In combination with a structure to be heated, heating means therefor, a temperature control device for said heating means having a thermostat for maintaining a predetermined temperature within said structure, a timing mechanism for rendering said thermostat effective including a thermostatic device responsive to predetermined ambient temperatures exterior of said structure, said timing device varying the time at which said temperature control apparatus is to be effective dependent upon said ambient temperature.

9. In combination, a structure to be heated, a heating means therefor, a temperature control apparatus for said heating means having a thermostat, a timing device for varying the time at which said thermostat is rendered effective to maintain a predetermined temperature within said structure, said timing device having a switch including a cam, and a thermostatic device having a member movable toward and from said cam and cooperating therewith to render said thermostat effective, said thermostatic device being responsive to predetermined ambient temperatures exterior of the structure to be heated.

10. A temperature control apparatus for a heating system including a thermostat responsive to the heating effect of said heating system for maintaining a predetermined temperature, a timing mechanism for varying the time at which said thermostat is rendered effective, said timing mechanism including an adjustable cam, and thermostatic means having a member cooperating with and movable toward and from said cam, said thermostatic means being responsive to predetermined temperatures exterior of said heating system.

11. In combination, a structure to be heated, a heating means therefor, a temperature control apparatus for said heating system including a pair of thermostats for controlling the heating system to maintain different predetermined temperatures within the structure to be heated, a timing means for rendering one or the other of said thermostatic means effective to control said heating system including a switching device having a thermostatic member responsive to ambient temperatures exterior of said structure to be heated for varying the time one or the other of said thermostatic means is rendered effective dependent upon said ambient temperatures.

12. In combination, a structure to be heated, a heating means therefor, a pair of thermostats for controlling said heating means to maintain different predetermined temperatures within the structure to be heated, a timing mechanism including a device responsive to ambient temperatures exterior of said structure for transferring the control of the heating system between said thermostatic means, said timing means varying the time one or the other of said thermostats is rendered effective, dependent upon ambient temperature conditions.

In witness whereof, I have hereunto set my hand.

WILBUR L. MERRILL.